(12) United States Patent
Kinsella et al.

(10) Patent No.: US 12,324,982 B2
(45) Date of Patent: Jun. 10, 2025

(54) GAME SYSTEM WITH GEARS AND INDICIA

(71) Applicant: NECA LLC, Hillside, NJ (US)

(72) Inventors: Bryan Kinsella, Chapel Hill, SC (US); Chas Delong, Tacoma, WA (US); Justin Ziran, San Marcos, CA (US)

(73) Assignee: NECA LLC, Hillside, NJ (US)

( * ) Notice: Subject to any disclaimer, the term of this patent is extended or adjusted under 35 U.S.C. 154(b) by 362 days.

(21) Appl. No.: 18/090,295

(22) Filed: Dec. 28, 2022

(65) Prior Publication Data

US 2023/0201713 A1    Jun. 29, 2023

Related U.S. Application Data

(60) Provisional application No. 63/294,278, filed on Dec. 28, 2021.

(51) Int. Cl.
*A63F 13/24* (2014.01)

(52) U.S. Cl.
CPC .......... *A63F 13/24* (2014.09); *A63F 2250/18* (2013.01)

(58) Field of Classification Search
CPC .............................. A63F 13/24; A63F 2250/18
See application file for complete search history.

(56) References Cited

U.S. PATENT DOCUMENTS

| | | | |
|---|---|---|---|
| 2,167,271 A | 7/1939 | Bowzer | |
| 3,131,859 A | 5/1964 | Nilsson | |
| 3,276,682 A | 10/1966 | Phelps | |
| 3,419,973 A | 1/1969 | Manotas et al. | |
| 3,513,568 A | 5/1970 | Shuford, Jr. et al. | |
| 4,165,710 A * | 8/1979 | Gaetano | A63B 71/0672 235/114 |
| 6,899,332 B2 | 5/2005 | Weisman | |
| 6,899,333 B2 | 5/2005 | Weisman | |
| 6,918,590 B2 | 7/2005 | Annis et al. | |
| 7,104,543 B2 | 9/2006 | Wilk et al. | |
| 7,281,714 B2 | 10/2007 | Wilk et al. | |
| 7,290,767 B2 | 11/2007 | Wilk et al. | |
| 7,491,061 B2 | 2/2009 | Mickey | |
| 8,256,771 B2 | 9/2012 | Marquez | |
| 8,678,874 B2 | 3/2014 | Gary et al. | |
| 9,682,310 B2 | 6/2017 | Ziran et al. | |
| 2014/0084542 A1 | 3/2014 | Ziran et al. | |

* cited by examiner

*Primary Examiner* — Omkar A Deodhar
*Assistant Examiner* — Shauna-Kay Hall
(74) *Attorney, Agent, or Firm* — McCarter & English, LLP

(57) ABSTRACT

Provided is a game system with gears and indicia, for modular game information record-keeping and record-changing devices, systems, and associated methods based on sets of mechanical gears having game indicia provided thereon. The architecture of the system uses combinations of mechanical gears, cams, shafts, clutches of various types, and other mechanical components that constitute an analog "computer" performing basic mathematical functions, managing data, or performing analogs for life principles—such as the impact of events, physics-based or fantasized realities, interpersonal relationships, behavioral characteristics, conflict dynamics, etc.

10 Claims, 16 Drawing Sheets

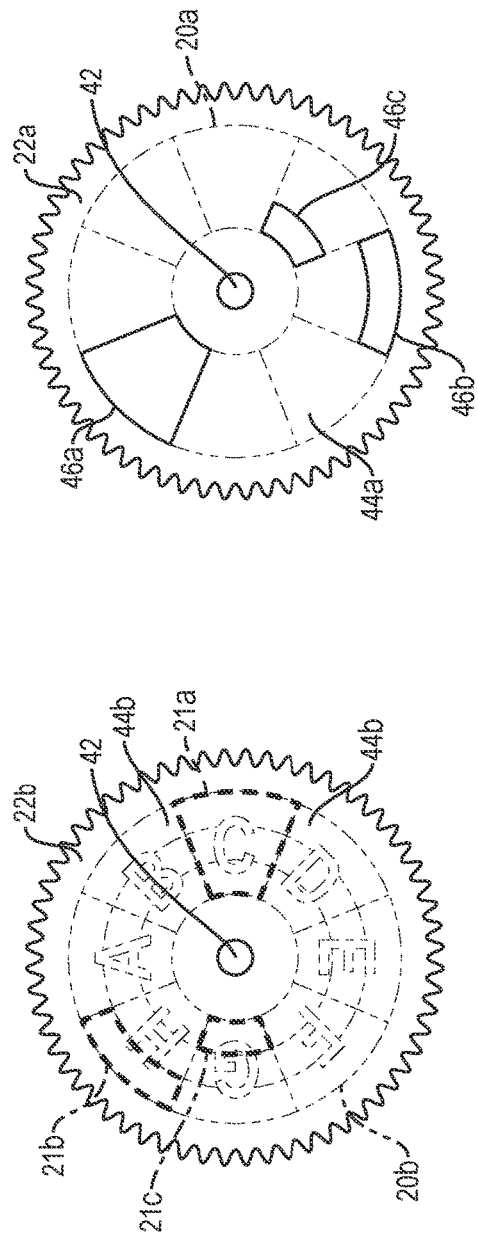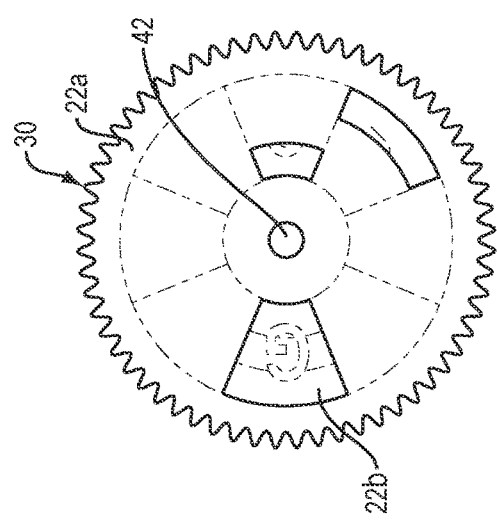

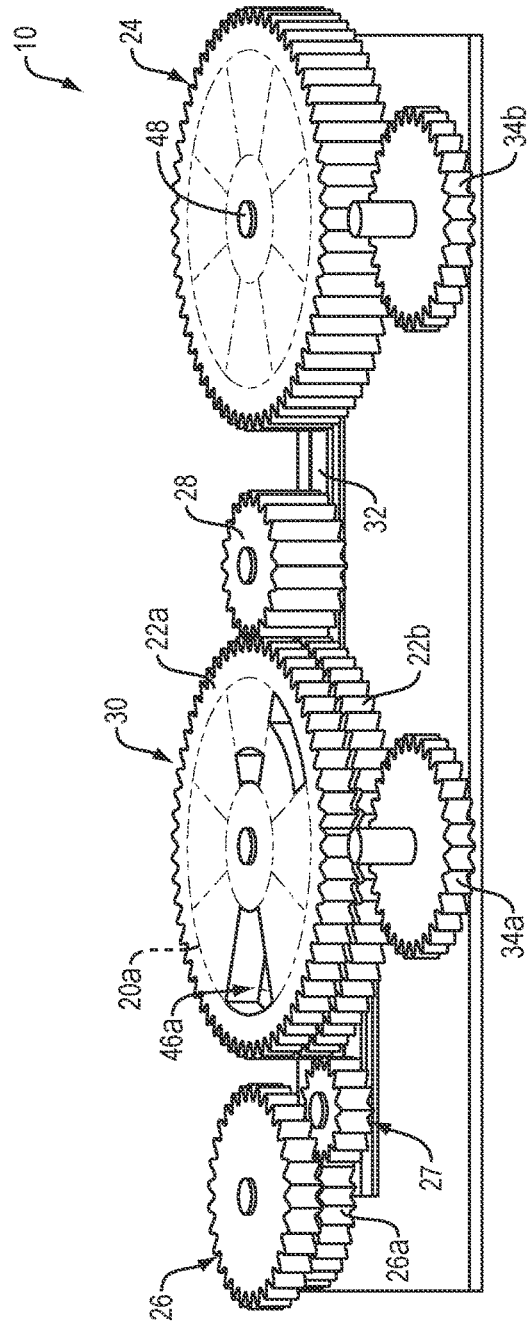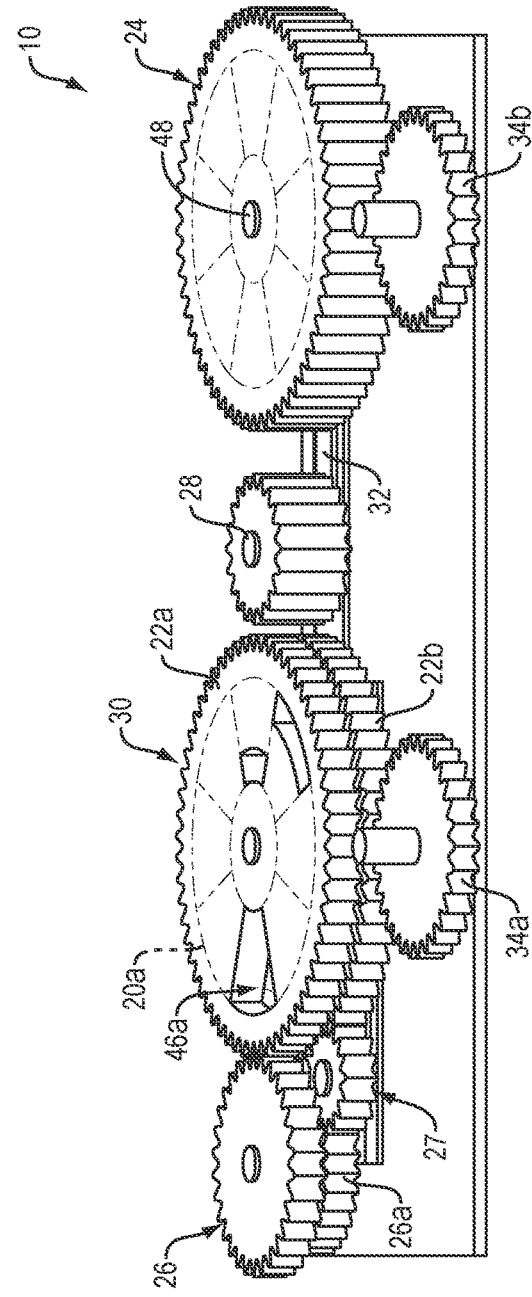
FIG. 7A
FIG. 7B

GAME SYSTEM WITH GEARS AND INDICIA

RELATED APPLICATIONS

This application claims the benefit under 35 U.S.C. § 119(e) of U.S. Provisional Application No. 63/294,278, filed on Dec. 28, 2021.

BACKGROUND

Field of the Disclosure

The present disclosure relates to record-keeping and record-changing devices, systems, and associated methods, and more specifically relates to modular record-keeping and record-changing devices, systems, and associated methods comprising a plurality of gears or disks having game indicia provided thereon.

Related Art

A degree of realism can be added to games, especially war and fantasy games, through the use of miniature figures to represent characters in the games. Participants in the game can manipulate characters, represented by miniature figures and endowed with certain characteristics, e.g., strength and range of movement, that enters into the resolution of a given event, such as a battle or other interface between characters. As the complexity of each character and each scenario grows, and as the number of characters increases, the complexity of the game increases.

While this can be an effective manner to conduct the parameters of interaction between game components requiring multiple pieces of information in certain scenarios, dial-based adjustable record-keeping devices have limitations. For a game playing community that embraces simulation—whether physically grounded (as in realistic war games) or intricately imagined (as in fantasy games), there is acknowledgement that, as a single variable does not govern the interactions of real life, so is a single variable insufficient in creating a robust model for reality or an imagined universe. The game developing community addresses this idiosyncrasy of the available technology by modifying/customizing data groupings to model a figure's attributes. In a simple, understandable analogy, existing record-keeping dial systems can model two characters-Clark Kent (i.e., Superman) and Bruce Banner (i.e., The Hulk) from the superhero universes. In these dial systems, Clark Kent/Superman's damage and strength attributes may inversely correlate—as damage increases, strength decreases. Whereas Bruce Banner/The Hulk may take on-going damage quickly with a sharp up-tick in strength data (and a revitalized damage metric) at the point at which other character models might be at game expiration.

SUMMARY

The present disclosure relates to modular game information record-keeping and record-changing devices, systems, and associated methods based on sets of mechanical gears having game indicia provided thereon. The architecture of the system uses combinations of mechanical gears, cams, shafts, clutches of various types, and other mechanical components, that constitute an analog "computer" performing basic mathematical functions, managing data, or performing analogs for life principles-such as the impact of events, physics-based or fantasized realities, interpersonal relationships, behavioral characteristics, conflict dynamics, etc.

BRIEF DESCRIPTION OF THE DRAWINGS

The foregoing features of the disclosure will be apparent from the following Detailed Description, taken in connection with the accompanying drawings, in which:

FIGS. 6A, 6B, and 6C are top views illustrating a dynamic information overlapping gear set of the device of FIG. 1;

FIGS. 7A and 7B are perspective views of the device of FIG. 1, illustrating operation of record-changing and record-keeping sub-systems;

DETAILED DESCRIPTION

The present disclosure relates to record-keeping and record-changing, or game system and gear, devices, systems, and associated methods, and more specifically, to modular record-keeping and record-changing devices, systems, and associated methods comprising a plurality of gears or disks having game indicia provided thereon. The present disclosure is not limited to embodiments having specific dimensions. Thus, any dimensions provided herein are exemplary and are not intended to limit the scope of the present disclosure.

Figure 1:
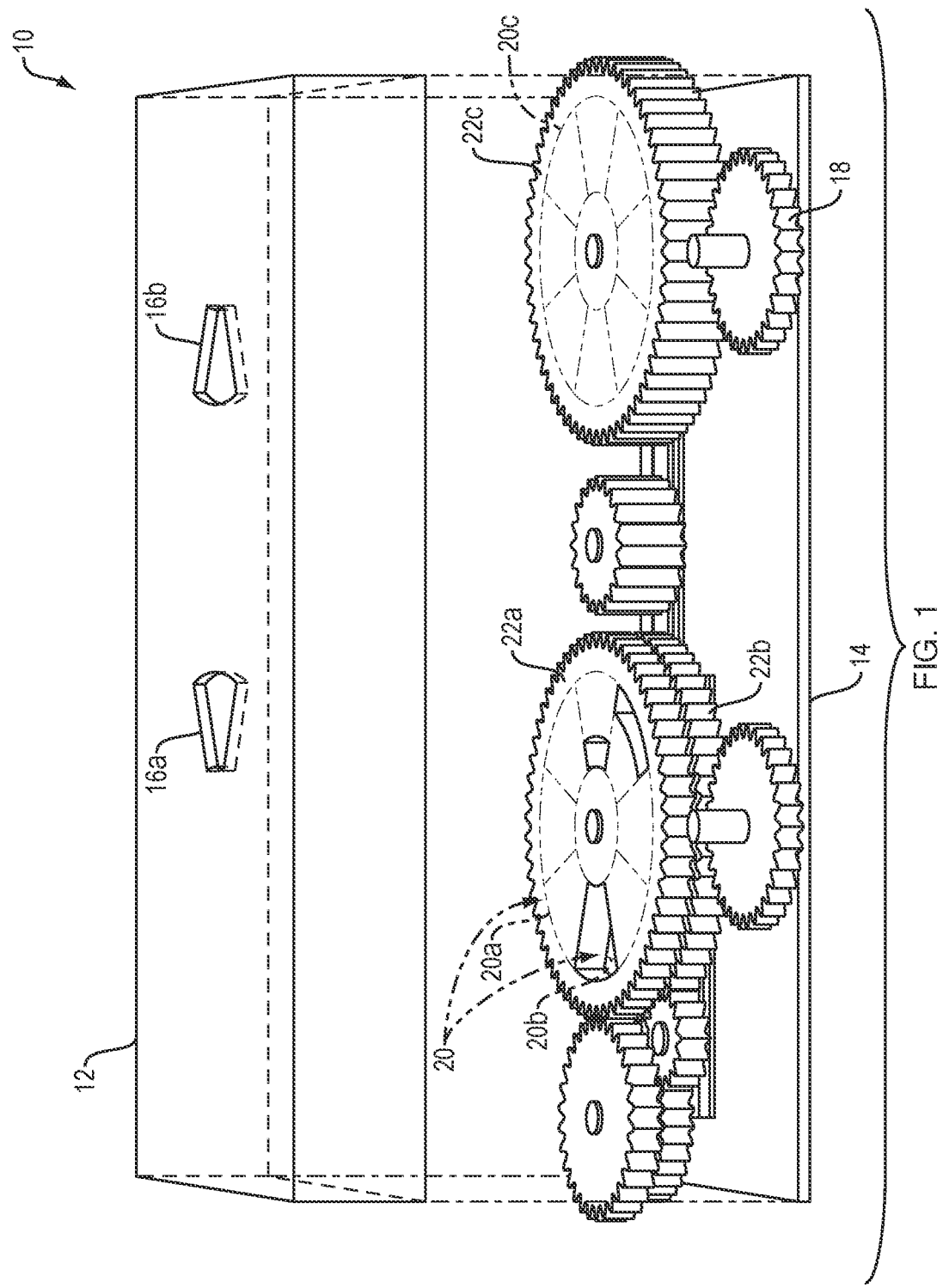
FIG. 1 is a perspective view of a game system and gears according the present disclosure.

FIG. 1 illustrates a record-keeping and record-changing device 10 for managing the display of unique data sets. The device 10 includes a top gear housing 12 and a bottom gear housing 14 with housing apertures 16a and 16b in the top gear housing 12. Gear system 18 and game indicia sets 20, 20a, 20b and 20c (e.g., providing game information) are positioned within the top and bottom gear housings 12 and 14. As shown in FIG. 1, game indicia sets 20, 20a, 20b and 20c are printed, adhered, etched or otherwise provided on corresponding gears 22a-c of the gear system 18, and are viewable through the housing apertures 16a and 16b of the top gear housing 12.

The combined components of the device 10 perform one of the functions of record-keeping by only showing the portions of the indicia 20, 20a, 20b and 20c on the gears 22a-c that are positioned under the housing apertures 16a and 16b. Indicia 20, 20a, 20b and 20c positioned at any other position under the top gear housing 12 is hidden. The housing apertures described herein (e.g., apertures 16a and 16b) can be areas where material has been removed from a top wall of the top gear housing 12 or can be areas of transparent material (e.g., windows) allowing a user to view the game indicia 20, 20a, 20b and 20c provided on the gears 22a-c within the interior of the device 10. Additionally, an indicator device (e.g., an arrow, pointer, illuminated area, etc.) can be used to identify one or more particular indicia from the indicia sets 20a-c. Accordingly, it should be understood that the device 10 can include any mechanism, device, pointer, indicator, or the like that can identify one or more particular items of indicia.

Figure 2:
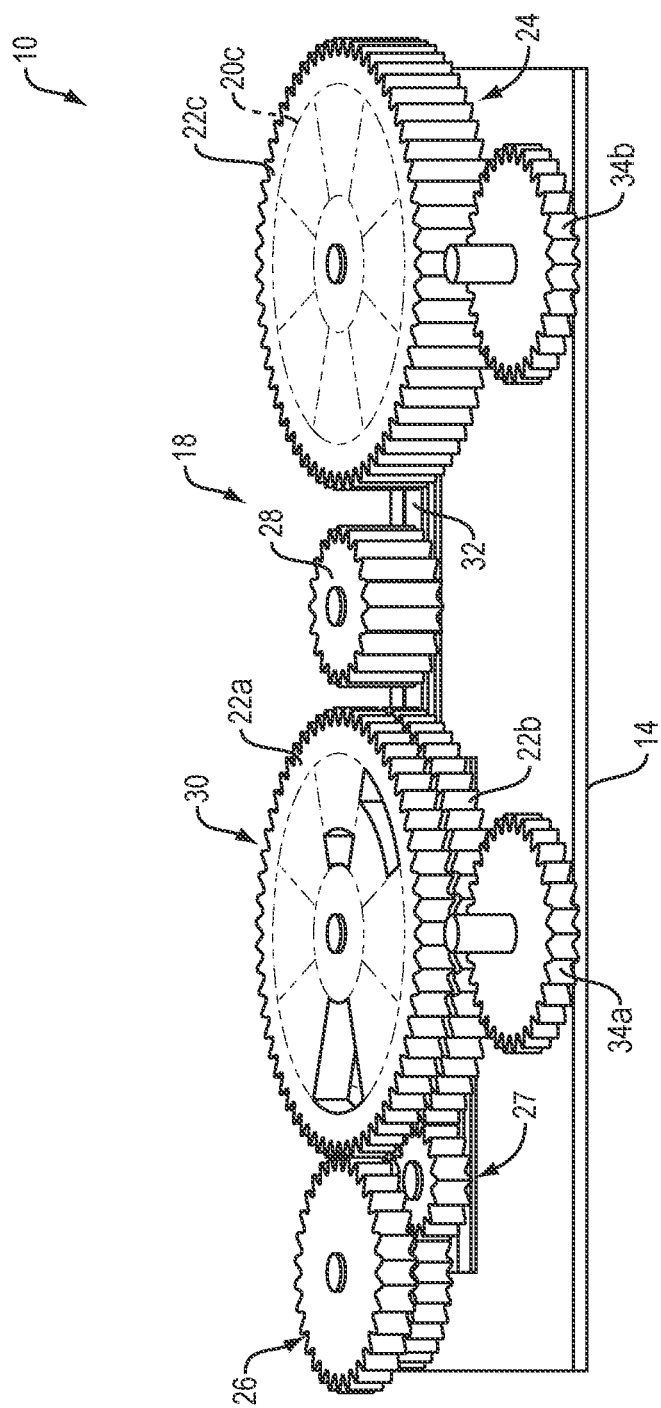
FIG. 2 is a perspective view of the device of FIG. 1, with a top housing removed.

FIG. 2 further illustrates the record-keeping function of the gear system 18 of the record-keeping and record-changing device 10. As shown, gear system 18 is comprised of the following: a gear and cam sub-system for managing record-keeping and record-changing 24, a record-changing gear sub-system 26, a record-keeping gear sub-system 28, a dynamic information over-lapping gear set 30, including gears 22a and 22b, a transmission arm for physical engagement with gears 28, 26 and 30, and first and second powering gears 34a and 34b.

Figure 3:
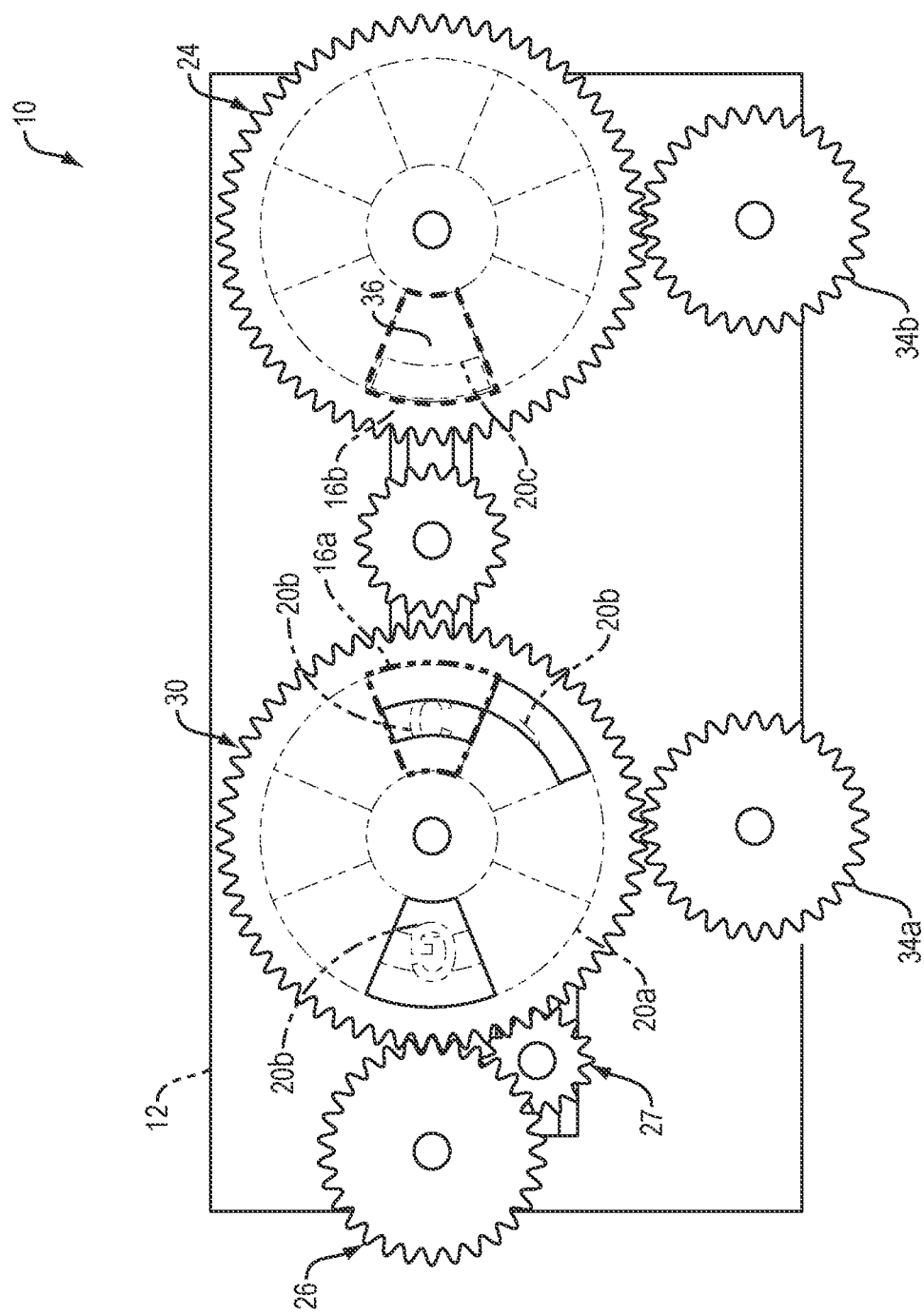
FIG. 3 is a top view of the device of FIG. 1.

With reference to FIG. 3, game indicia 20b on the gear 24 is viewable through the housing aperture 16b. The powering gear 34b is used to engage the rotation of gear 24. Direct manual manipulation of gear 24 may also be employed, for example, through an aperture (not shown) in a sidewall of the top gear housing 12. As game play evolves, game indicia 20c on a top gear face 36 of gear 24 are cycled through the visibility of the housing aperture 16b. In so doing, the bottom face of gear 24 moves in tandem therewith.

Figure 4A:
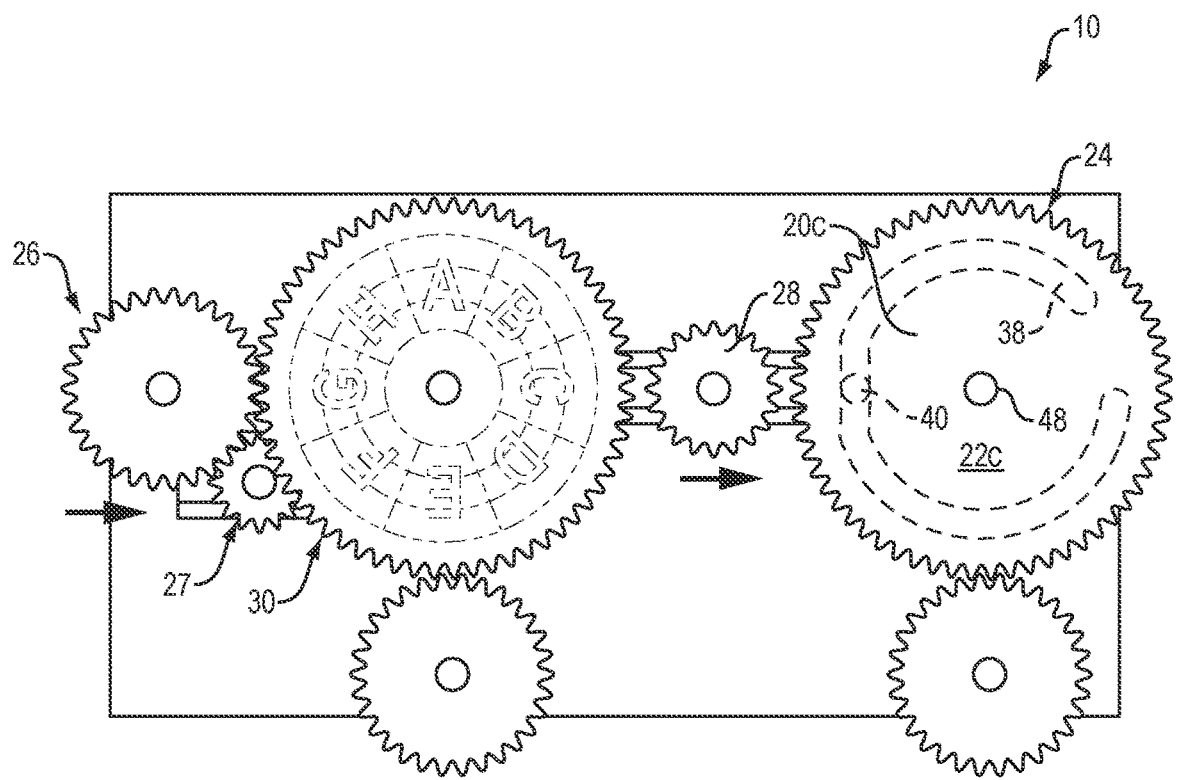
FIGS. 4A and 4B are top views of the device of FIG. 1, illustrating operation of the gears and cam.
Figure 4B:
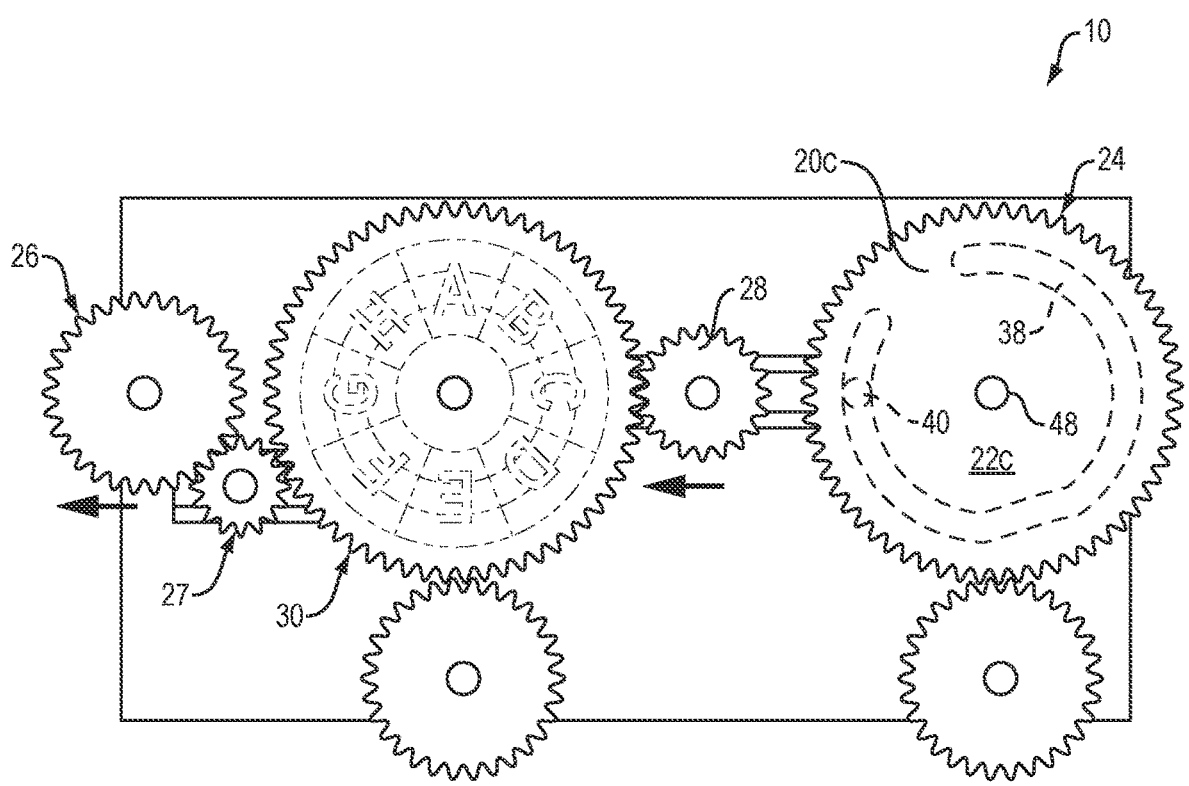
Figure 5A:
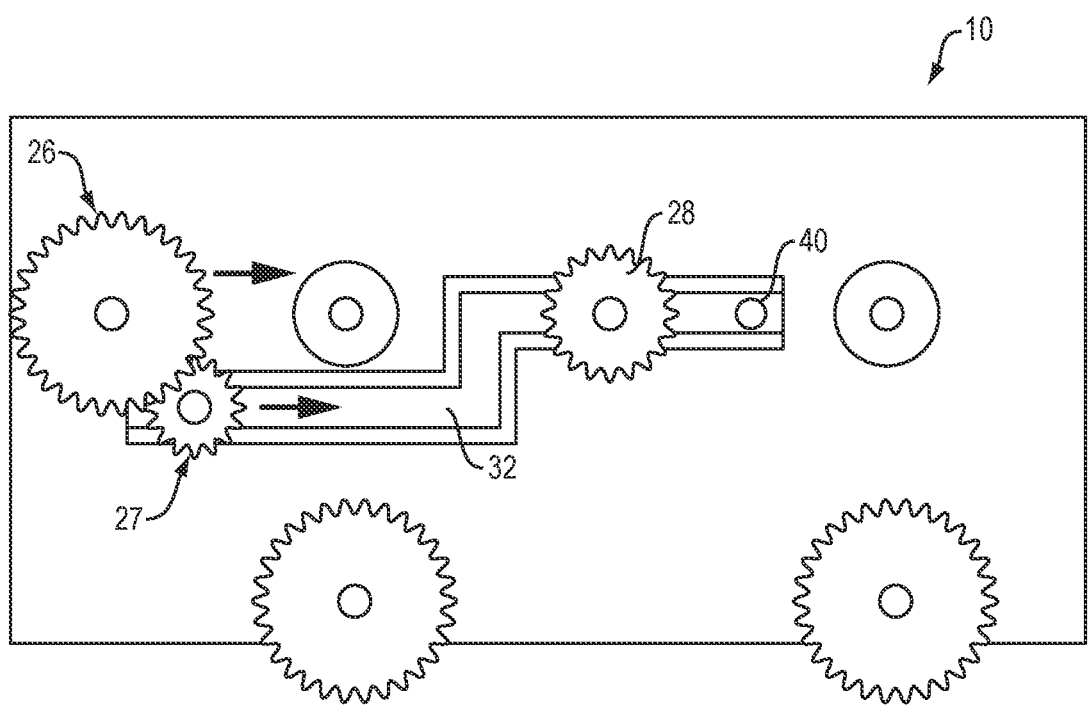
FIGS. 5A and 5B are top views of the device of FIG. 1, illustrating operation of a transmission arm of the gear and cam sub-systems.
Figure 5B:
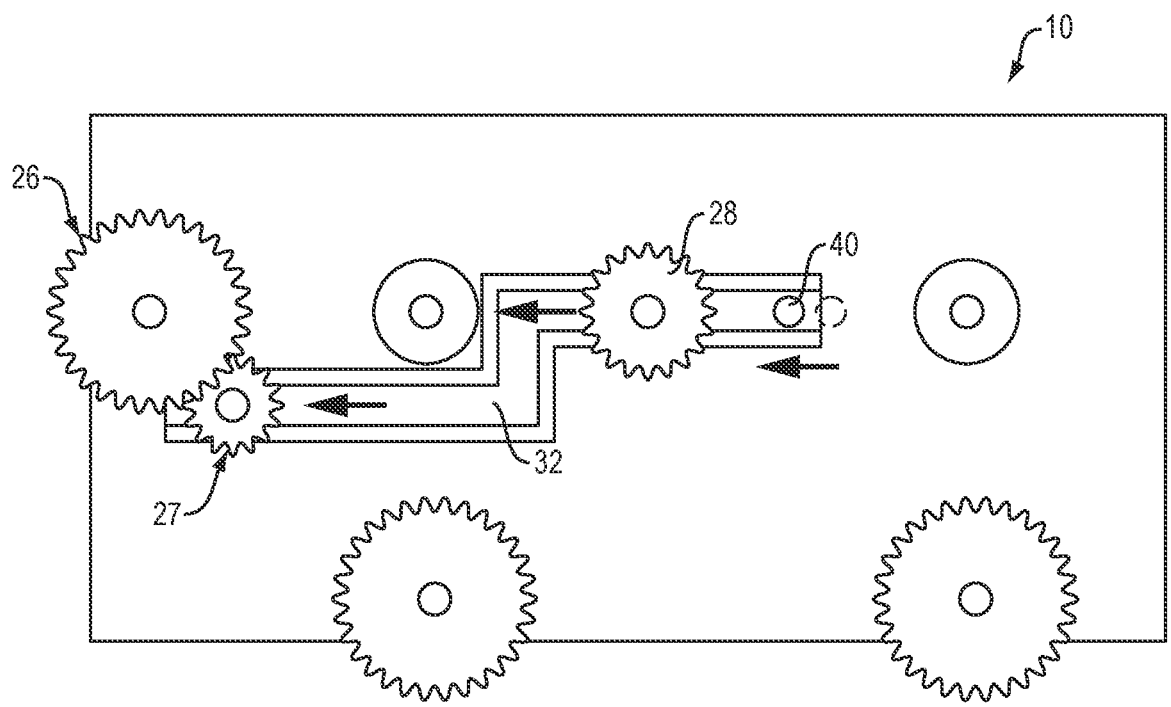

FIGS. 4A-5B illustrate operation of the record-keeping and record-changing device 10. Specifically, FIG. 4A shows the record-keeping and record-changing device 10 in a first configuration, where gear 26 is engaged with gear 30 and gear 28 is disengaged from the gear 30. FIG. 4B shows the record-keeping and record-changing device 10 in a second configuration, where gear 26 is disengaged from gear 30 and gear 28 is engaged with gear 30. FIGS. 5A and 5B show the record-keeping and record-changing device 10 in the respective first and second configurations described in connection with FIGS. 4A and 4B, with the gears 24 and 30 removed to illustrate operation of the transmission arm 32. As shown in FIGS. 4A and 4B, a cam groove 38 is provided on the bottom gear face of gear 24. The cam groove 38 receives a tracking pin 40 attached to the transmission arm 32 that engages gears 28 and 26. As the game indicia 20c of gear 24 is presented (e.g., through the aperture 16b), and the gear 24 is rotated, the cam groove 38 can move the tracking pin 40 either away from or towards a center axis 48 of gear 24.

As shown in FIG. 4B, when the tracking pin 40 is moved away from the center of gear 24, the transmission arm 32 follows, causing the gear 28 to engage gear 30, while simultaneously disengaging gear 26 from gear 30. When the gear 28 engages gear 30, upper and lower stacked portions of the gear move together. When gear 28 is disengaged, and gears 26 and 27 are engaged with upper and lower gears of composite gear 30, the upper and lower gears move in opposite directions. Indicia on the lower gear can be seen through one or more apertures on the upper gear.

FIGS. 6A-C show the components of gears 22a and 22b of gear set 30 in greater detail. Specifically, FIG. 6A is a top view of the bottom information gear 22b, FIG. 6B is a top view of the top information gear 22a, and FIG. 6C is a top view of gear 30 with the bottom information gear 22b positioned below the top information gear 22a. As shown, the gear 30, is comprised of the top and bottom gears 22a and 22b—each rotating around a shared central axis 42. The top gear 22a and the bottom gear 22b have the indicia 20a and 20b on respective upward facing gear faces 44a and 44b. Additionally, the top information gear 22a may have gear face apertures 46a-c that enable portions of the indicia 20b, for example, indicia at 21a, 21b, and 21c on the upward facing gear face 44b of the bottom information gear 22b to be viewed therethrough. In this configuration, it is the visual combination of indicia 20a from the top information gear 22a and the visible indicia (e.g., indicia 21a-c) on the bottom information gear 22b that create a playable data set of indicia, which is viewable through the housing aperture 16a. The gear apertures described herein (e.g., apertures 46a-c) can be areas where material has been removed from a gear (e.g., as shown in FIGS. 1-6) or can be areas of transparent material (e.g., windows), allowing a user to view game indicia sets provided on gears that are otherwise obscured from view (e.g., e.g., indicia set 20b provided on gear 22b), and indicating one or more particular indicia from the set. Additionally, one or more of the gears described herein could be formed from a transparent material and an indicator device (e.g., an arrow, pointer, illuminated area, etc.) can be used to identify one or more particular indicia from an indicia sets provided on a gear that is otherwise obscured. Accordingly, it should be understood that the gears described herein can include any material, mechanism, device, pointer, indicator, or combination thereof that can identify one or more particular indicia on an obscured (e.g., lower) gear.

FIGS. 7A and 7B are perspective views of the device 10 further illustrating operation thereof. Specifically, FIG. 7A shows the device 10 positioned in a first configuration, discussed, for example, in connection with FIGS. 4B and 5B, such that gear 30 is engaged with gear 28 and disengaged with gear 26, and FIG. 7B shows the device 10 positioned in a second configuration, discussed, for example, in connection with FIGS. 4A and 5A, such that gear 30 is disengaged with gear 28 and engaged with gear 26. In the embodiment shown in FIGS. 7A and 7B, gear 28 is a gear with a height such that when gear 28 is engaged with gear 30, the top information gear 22a and the bottom information gear 22b, each having a height of approximately half the total height of gear 28, such that both will be engaged equally. Gears 22a and 22b can have equal diameters and can have matching gear teeth configured to engage gear 28. Accordingly, when the powering gear 34a rotates the bottom information gear 22b, the bottom information gear 22b in turn rotates gear 28 which in turn rotates the top information gear 22a at the same rate. Consequently, indicia 20b on the bottom information gear 22b remains in relative position to the gear face apertures 46 (see, e.g., apertures 46a-c shown in FIG. 6b) on the top information gear 22a such that rotation of gear 30 maintains a stable data set during rotation. Furthermore, indicia 20b viewable through apertures 46 and indicia 20a is unveiled through the housing aperture 16a as a single cohesive data set.

As the tracking pin 40 (see FIGS. 4A, 4B, 5A and 5B) moves towards gear 24 center axis 48, the transmission arm 32 moves gear 28 away from gear 30 to disengage gear 30 while simultaneously engaging gear 26 with gear 30.

The top information gear 22a and the bottom information gear 22b of composite gear 30 are independently rotatable when gear 26 and gear 27 engage gears 22a and 22b of gear 30, whereas gear 28 engages both the top information gear 22a and the bottom information gear 22b in the same relative position, producing synchronous motion therebetween. According to some embodiments, gear 26 can produce rotational movement for the top information gear 22a that is opposite to the rotational direction of the bottom information gear 22b due to gear 27 meshing with gear 22b and gear 26a. Gear 26a has a smaller diameter than the upper portion of gear 26. As such, indicia 20b on the upward facing gear face 44b of the bottom information gear 22b, formerly hidden beneath the top information gear 22a, can cycle past the gear face apertures 46 of the top information gear 22a, such that they are visible therethrough. As indicia 20b of the bottom information gear 22b cycles past the gear face apertures 46 of the top information gear 22a, unique data sets are created in combination with the indicia 20a of the top information gear 22a. For example, a first data set could include information for a first indicium from the indicia 20b provided on the bottom information gear 22b and viewable through the aperture 46a of the top information gear 22a and a second indicium from the indicia 20a provided on the top information gear 22a, the first and second indicia also being viewable through the housing aperture 16a. By engaging gear 28 with gear 30 and rotating the powering gear 34a in communication therewith, the top information gear 22a and the bottom information gear 22b are synchronously rotated to produce a second data set, including a third indicium from the indicia 20b provided on the bottom information gear 22b and viewable through an aperture 46 of the top information gear 22a and a fourth indicium from the indicia 20a provided on the top information gear 22a, the third and fourth indicia being viewable through the housing aperture 16a. Conversely, by engaging gear 26 with gear 30 and rotating the powering gear 34a in communication therewith, the top information gear 22a and the bottom information gear 22b are asynchronously rotated to produce a third data set including a fifth indicium from the indicia 20b provided on the bottom information gear 22b and viewable through an aperture 46 of the top information gear 22a and a sixth indicium from indicia 20a provided on the top information gear 22a, the fifth and sixth indicia being viewable through the housing aperture 16a.

Upon the specified data set emerging at the demand of game play, the gear 24 can be re-oriented (e.g., rotated) such that the tracking pin moves away from the central axis 48 of gear 24, thereby moving the transmission arm 32 and causing gear 28 to engage gear 30, while simultaneously disengaging gear 26 from gear 30.

It should be understood that it is the alternation between these gear states and the play derived from them that creates the dynamic and complex data sets that are the basis for exciting, and continually fresh game play experiences.

While the device 10 described herein contemplates gear 30 including two (2) overlapping gears (e.g., top information gear 22a and bottom information gear 22b), other embodiments of gear 30 can include three (3) or more overlapping gears. In these more complex information systems, every overlapped information gear, excluding the bottom information gear, requires a gear face aperture 46, and it is the interplay between each layer's gear face aperture pattern and the indicia 20 employed on the balance of the gear face, that creates the geometric complexity of information viewable through the housing aperture 16a.

Figure 8A:
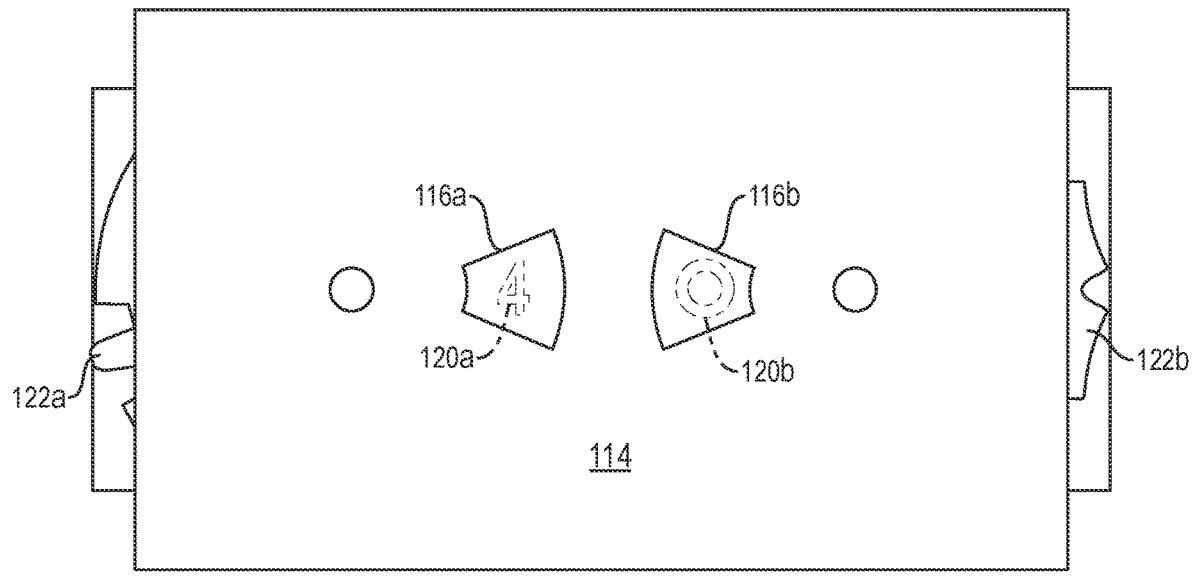
FIGS. 8A and 8B show another game system and gears having a Geneva gear sub-system.
Figure 8B:
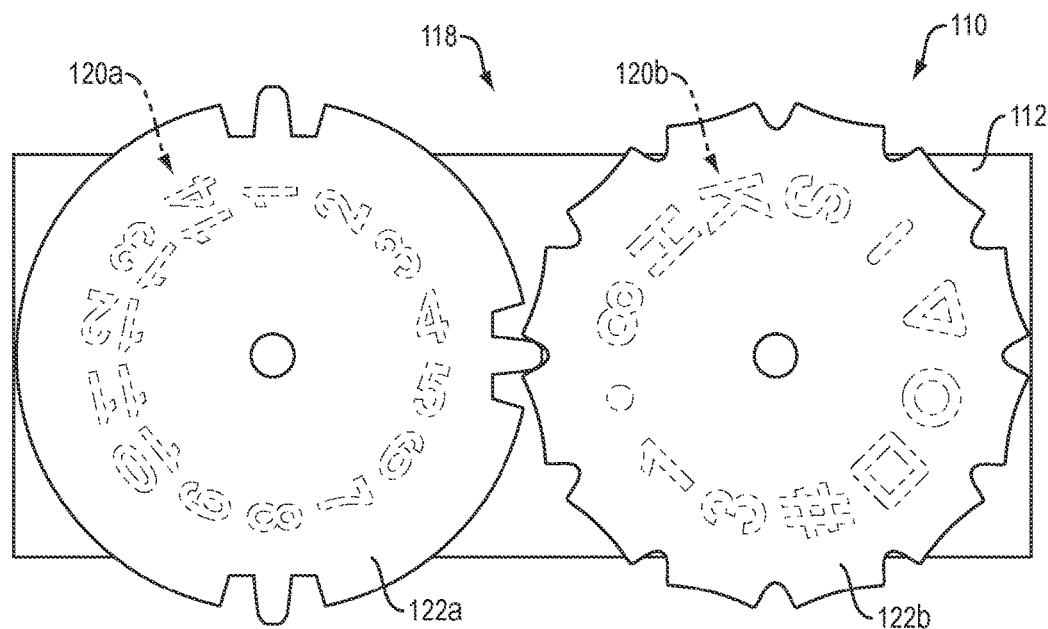

FIGS. 8A and 8B illustrate another exemplary record-keeping and record-changing device 110 for managing the display of unique data sets across time, including a Geneva gear system 118. Specifically, FIG. 8A is a top view showing the device 110 and FIG. 8B is a top view showing the device 110 with a top gear housing 112 removed. As shown, the device 110 includes the top gear housing 112 with housing apertures 116a and 116b, a bottom gear housing 114, and first and second Geneva gear components 122a and 122b, with a first set of game indicia 120a provided on Geneva gear 122a and a second set of game indicia 120b provided on Geneva gear 122b, together indicia 120. The game information/indicia 120a and 120b can be printed, adhered, etched or in some way made part of the respective gears 122a and 122b of the Geneva gear system 118, and are viewable through the respective housing apertures 116a and 116b of the gear housing 114. In this state, the combined components perform one of the functions of record-keeping by making visible only the portions of the indicia sets 120 on the gears 122a and 122b that are within the housing apertures 116a and 116b. All other gear indicia 120 at other positions under the top gear housing 114 are hidden.

Figure 9A:
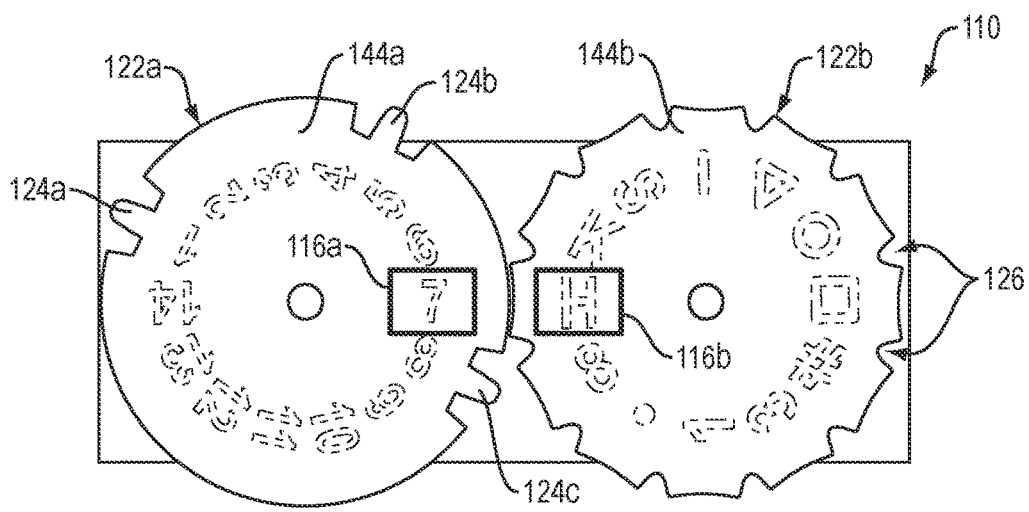
FIGS. 9A, 9B, 9C, 9D, 9E and 9F are top views of the device of FIGS. 8A and 8B, illustrating operation thereof.

FIGS. 9A-F illustrate operation of the record-keeping mechanism and device 110. Specifically, FIG. 9A depicts a driving or powering gear 122a configured as a sector gear with working teeth/pins 124a-c positioned at 3 points, for example, at 0 degrees (e.g., tooth 124a), 180 degrees (e.g., tooth 124c), and 90 degrees (e.g., tooth 124b) and a driven Geneva gear 122b. indicia 120 on upward facing gear faces 144a and 144b of the driving gear 122a and the Geneva gear 122b are in a starting position making the indicia 120 visible through the housing apertures 116a and 116b of the top gear system housing 114 (see, e.g., indicia "5" and "O" shown in FIG. 8A). As shown in FIG. 9A, indicia "7" on the driving gear 122a is concurrently visible with indicia "H" on the Geneva gear 122b, through the respective housing apertures 116a and 116b.

Figure 9B:
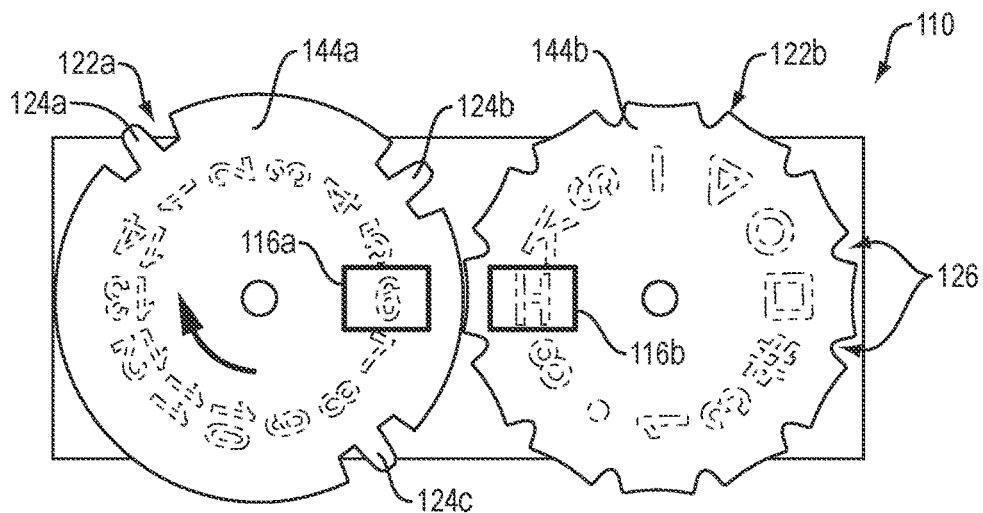
Figure 9C:
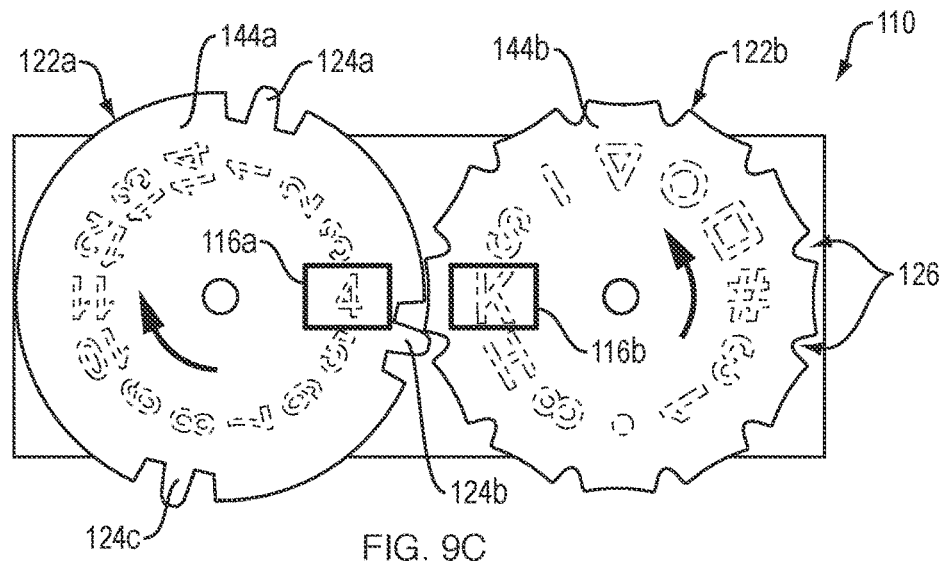

As the driving gear 112b rotates clockwise, driving gear indicia 120a visible through the top housing aperture 116a begin to cycle, indicia "7" leaves visibility, and indicia "6" is presented (see FIG. 9B). However, the Geneva gear system 118 is configured such that the indicia "H" of Geneva gear 122b, previously presented with indicia "7" provided on the driving gear 122a (see FIG. 9A), remains visible through aperture 116b and continues to remain visible until rotation of the working tooth/pin 124b at the 90 degree position, engages a notch 126 of the Geneva gear 122b and advances the Geneva gear 122b "forward" counter-clockwise one discreet position (see FIG. 9C). As shown in FIG. 9C, a new information state is provided where driving gear 122a indicia "4" is presented with Geneva gear 122b indicia "K" through respective housing apertures 116a and 116b.

Figure 9D:
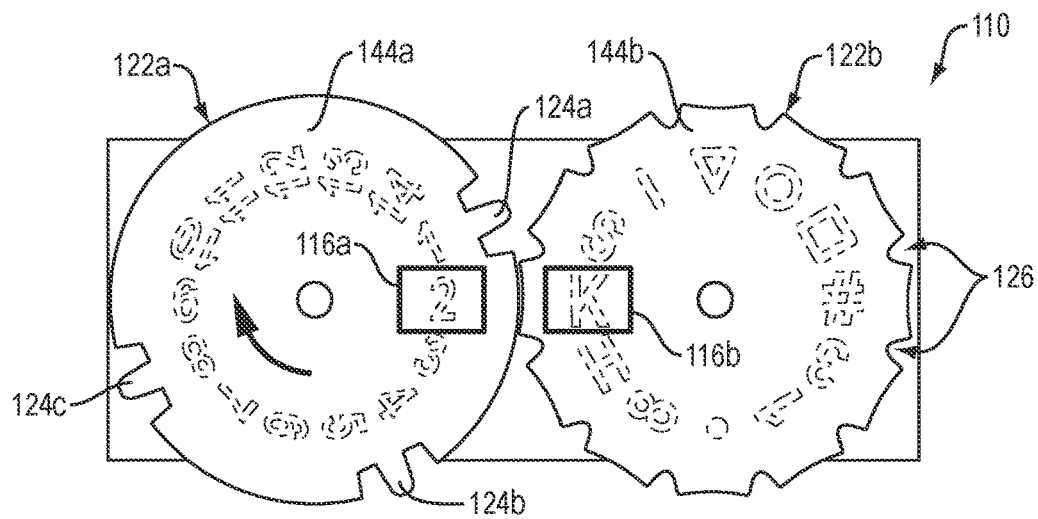
Figure 9E:
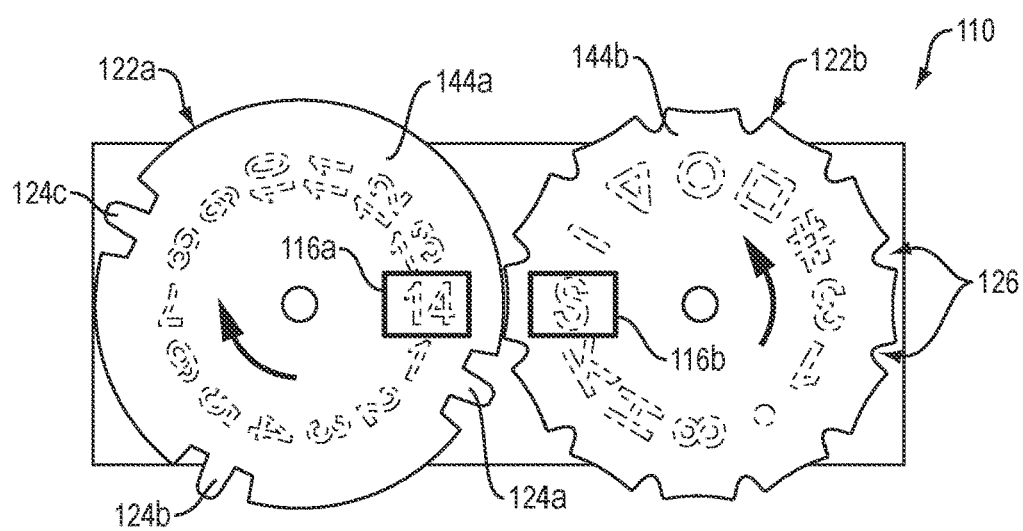

Further rotation of the driving gear 122a to the presentation of indicia "2" through the housing aperture 116a results in no movement to indicia "K" on the Geneva gear 122b (see FIG. 9D). Throughout this driving gear rotation, the data sets "4"-"K", "3"-"K", and "2"-"K" are consecutively revealed.

Figure 9F:
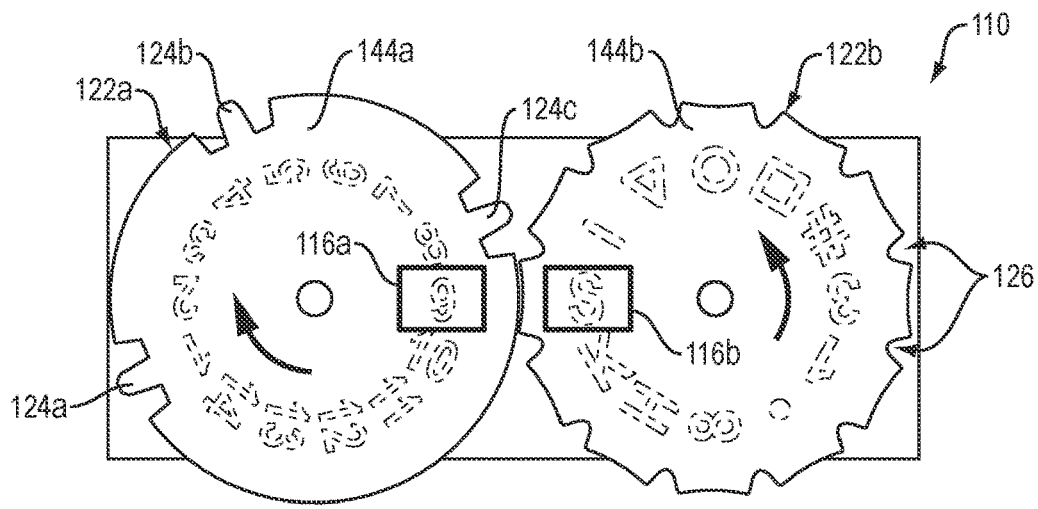

When the driving gear indicia 120a visible through the housing aperture 116a moves from "2" to "14" (see FIG. 9e), the working tooth/pin 124a in the 0 degrees position engages a notch 126 of the Geneva gear 122b and moves the Geneva gear 122b forward from a position where indicia "K" is visible through the housing aperture 116b to a position where indicia "S" is visible through the housing aperture 116b. From this point forward, until the working tooth/pin 124c in the 180 degree position is engaged with a notch 126 of the geneva gear 122b, visible data sets will move from "14"-"S" to "9"-"S" (FIG. 9F).

In this model of information management, the driving gear 122a with working teeth/pins 124a-c at the respective 0, 90, and 180 degree positions may represent a strategic game perspective relative to the game environment. It should also be understood that the working teeth/pins can be positioned in additional configurations, such as at 15, 30, 45, and 60 degree positions, for example, in a gameplay scenario where early Geneva gear 122*b* movement is more valuable. Conversely, the working teeth/pins could be positioned at the 210, and 270, 285, and 300 degree positions, where later Geneva gear 122*b* movement is more valuable for a gameplay scenario. It should also be noted that early and late movement of the Geneva gear indicia 120*b* can be achieved with modified indicia 120 and the same driving gear working teeth/pin patterns shown in FIGS. 9A-F. The relevant issue is the Indicia data set position relative to the working teeth/pin patterns.

The systems and devices described herein (e.g., devices 10 and 110) are modular and the record-changing characteristics of the devices can be easily altered by a user by replacing one or more components thereof. For example, with reference to device 110 described in connection with FIGS. 8A-9F, when a new game strategy required, the driving gear 122*a* may be removed from the gear housing 114 and replaced with another driving gear having a different configuration and gameplay characteristics. According to one example, a driving gear with a preferred working teeth/pin pattern or a driving gear with the same working teeth/pin pattern, but indicia data adjusted differently relative to the working teeth/pin pattern can replace the driving gear 122*a*. This change in driving gear produces a record-changing effect by creating driving gear and Geneva gear indicia combinations at different rates.

Figure 10A:
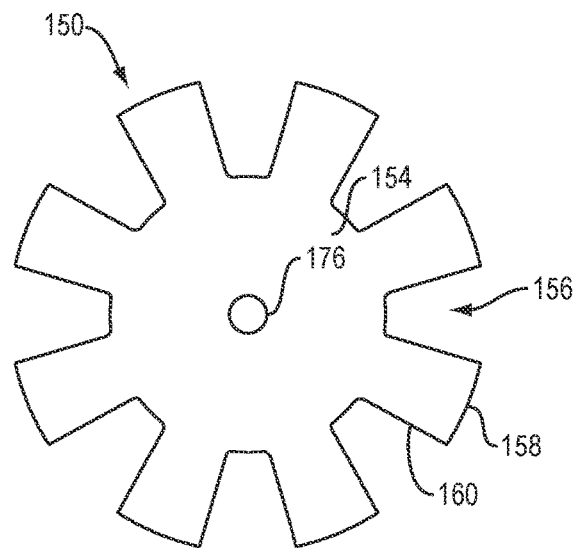
FIGS. 10A, 10B and 10C show a game system and gears with a variable geometry driving gear.
Figure 10C:
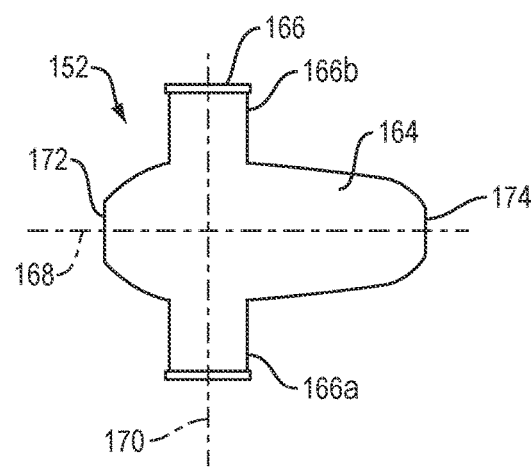
Figure 10B:
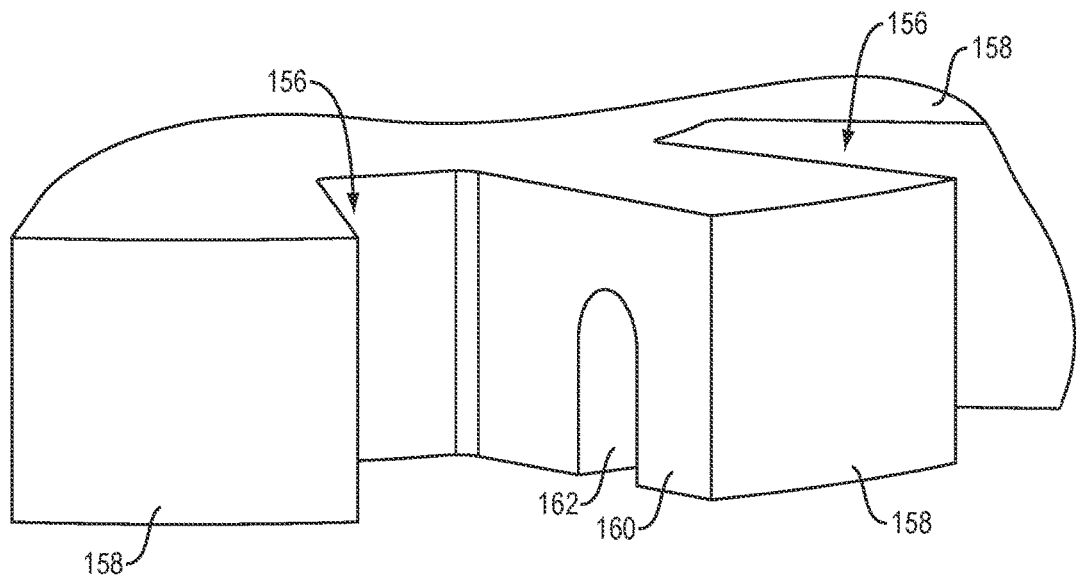

FIGS. 10A-C show components of another driving gear 150 of the present disclosure having variable geometry. Specifically, FIG. 10A is a top view of a driving gear main body 154 of the driving gear 150, FIG. 10B is an enlarged perspective view showing docking notches 156 and dock protrusions 158 of the driving gear 150, and FIG. 10C is a top view of an isolated working tooth/pin 152 of the driving gear 150. The driving gear 150 is configured for use with the record-keeping and record-changing device 110, discussed in connection with FIGS. 8A-9F, as a replacement for the driving gear 122*a*. As shown, the driving gear 150 includes isolated working teeth/pins 152 that are separate components from a driving gear main body 154. The driving gear main body 154 is configured with docking notches 156 along the circumferential area and dock protrusions 158, such that the driving gear main body 154 forms, for example, an asterisk, or blunted star shape. Lateral sides 160 of the dock protrusions 158 are configured with peg receiving notches 162. Each of the isolated working tooth/pin 152 has a tooth/pin body 164 with first and second cylindrical pegs 166*a* and 166*b*, together cylindrical pegs 166, extending from each side of said body 164 at 90 degrees to the center axis 168 of the tooth/pin body 164. Furthermore, the cylindrical pegs 166 extending from the tooth/pin body 164 are oriented around a same peg axis 170. This peg axis 170 is situated on the tooth/pin body 164 adjacent to a non-engagable end 172.

Figure 11A:
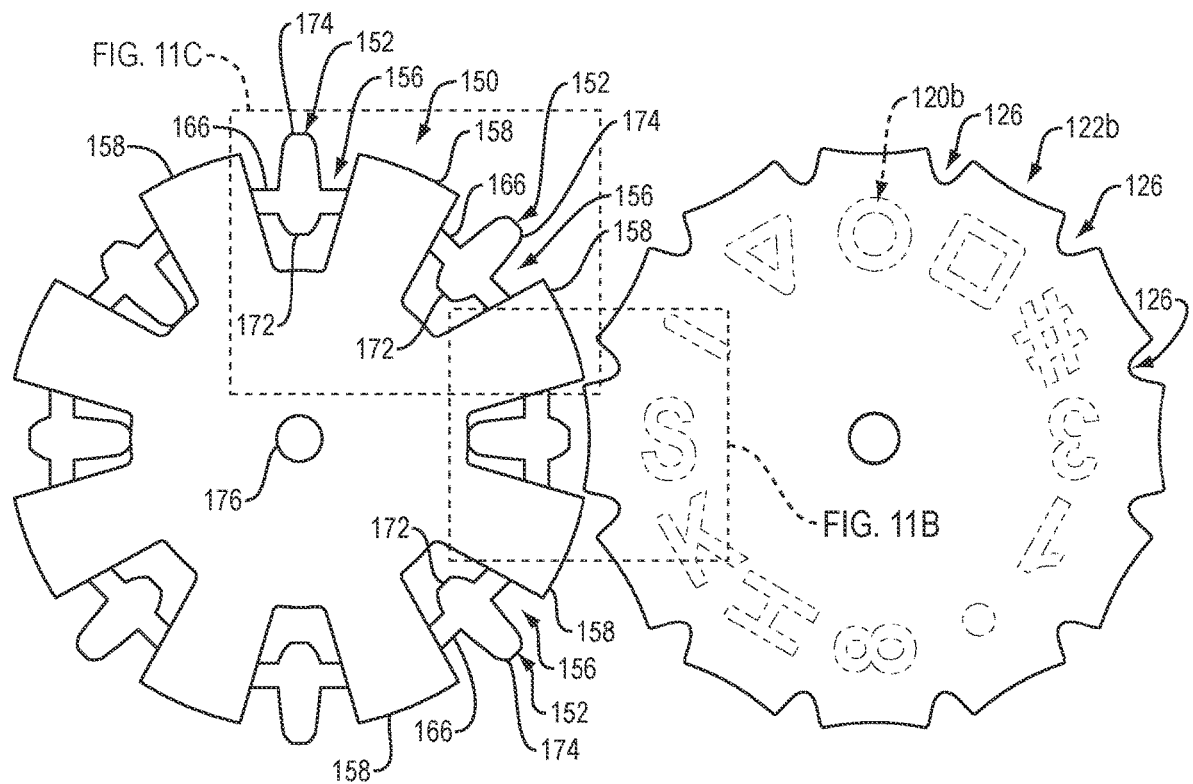
FIGS. 11A, 11B and 11C illustrate operation of working teeth/pins of the device shown in FIGS. 10A, 10B and 10C.
Figure 11B:
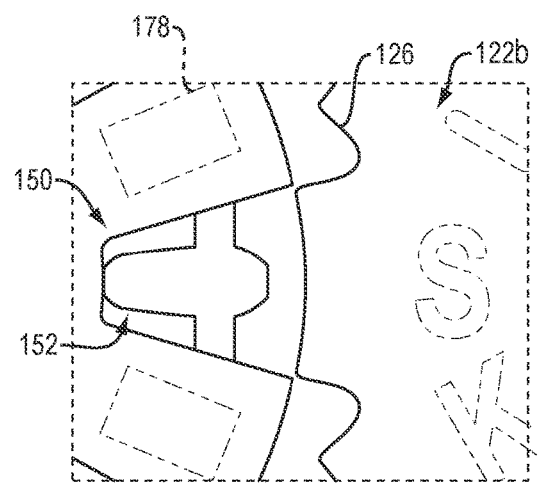
Figure 11C:
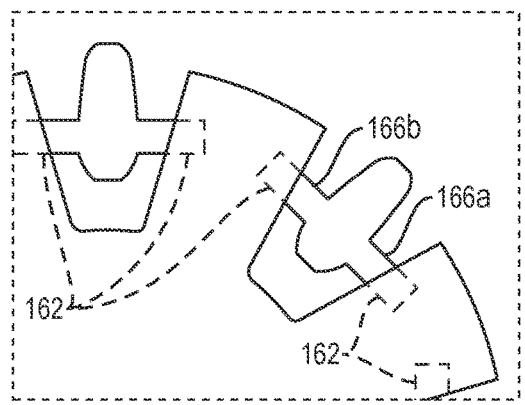

FIGS. 11A-C illustrate the driving gear 150 in an assembled configuration. Specifically, FIG. 11A is a top view of the driving gear 150 in an assembled configuration and engaged with the Geneva gear 122*b*, FIG. 11B is an enlarged top view showing an interface between the driving gear 150 and the Geneva gear 122*b*, and FIG. 11C is an enlarged top view of the driving gear 150 illustrating operation of the isolated working teeth/pins 152. In the assembled and functioning configuration presented in FIG. 11, each of the isolated working teeth/pins 152 are situated within docking notch 156 such that the cylindrical pegs 166 extending from the tooth/pin body 164 insert into the peg receiving notches 162 on the opposing dock protrusions 158. With the peg axis 170 aligned with the axis of the peg receiving notches, a pivot point is created which allows each isolated working tooth/pin 152 to pivot such that the non-engagable end 172 of the isolated working tooth/pin body 164 faces out and away from the center axis, and an engagable end 174 is facing towards the center axis 176 of the driving gear 150 or, contrarily, the engagable end 174 is facing out and away from the driving gear 150 center axis 176 while the non-engagable end 172 is facing in and towards the driving gear's center axis 176.

With the engagable end 174 of the isolated working tooth/pin 152 facing out, the driving gear section inclusive of the main body 154 assumes a standard working geometry with the capacity for engaging the notches 126 and advancing the Geneva gear 122*b* forward.

With the non-engagable end 172 facing out, and as a result of the peg axis 170 position on the tooth/pin body 164, the non-engagable end 172 is contained within the docking notch 156 area defined by the lateral sides 160 and the continuing "border" of the driving gear main body 154 circumference. In this position, the driving gear 150 rotates displaying indicia 178, but without engaging the notches 126 of the Geneva gear 122*b* and causing it to advance forward through its indicia data set 120*b*. Accordingly, each isolated working tooth/pin 152 situates in each docking notch 156 as described, and it is the decision to pivot each isolated working tooth/pin 152 that creates provides the variable geometry of the driving gear 150.

In game play, the effect is considerable when players have in-game-opportunity to adjust the driving gear with variable geometry 150 to create the evolution of new data sets previously un-available with a static driving gear geometry. According to embodiments of the present disclosure, the top gear housing 114 and the bottom gear housing 112 are configured such that access points to the driving gear with variable geometry 150 is limited to a hidden but accessible area that prevents opposing players from witnessing the engaging or non-engaging action/configuration of the isolated working teeth/pins 152.

Figure 12A:
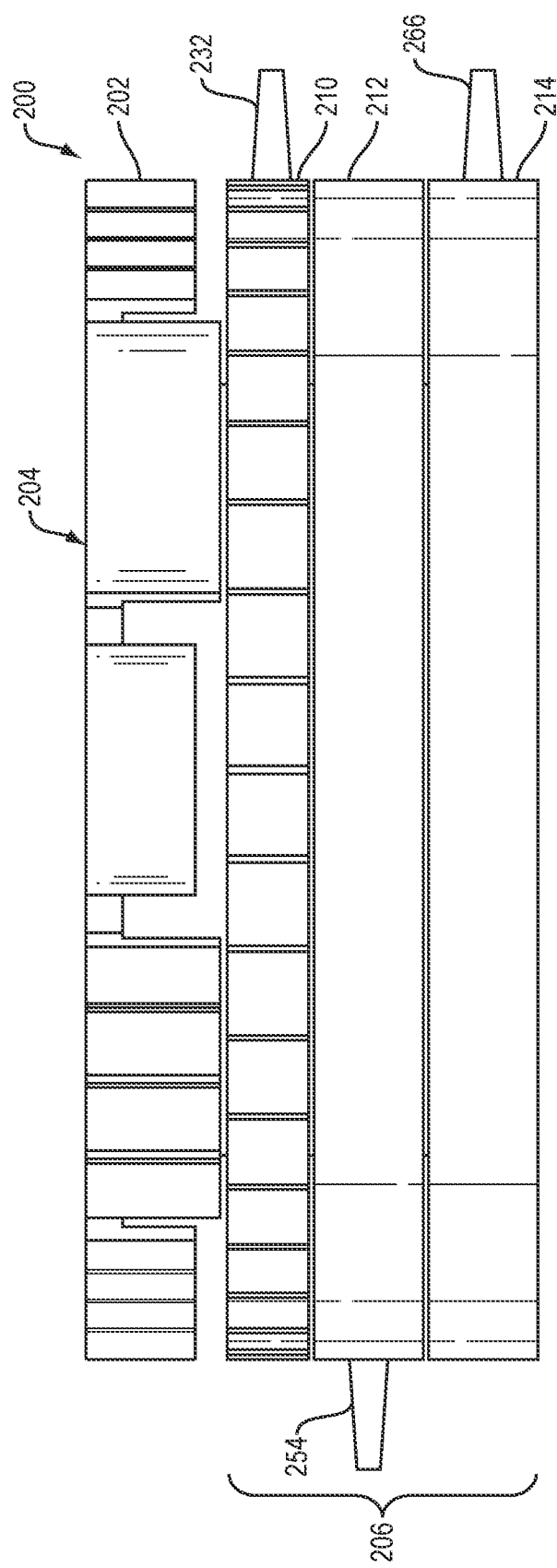
FIGS. 12A and 12B show a gear system having nested gears.
Figure 12B:
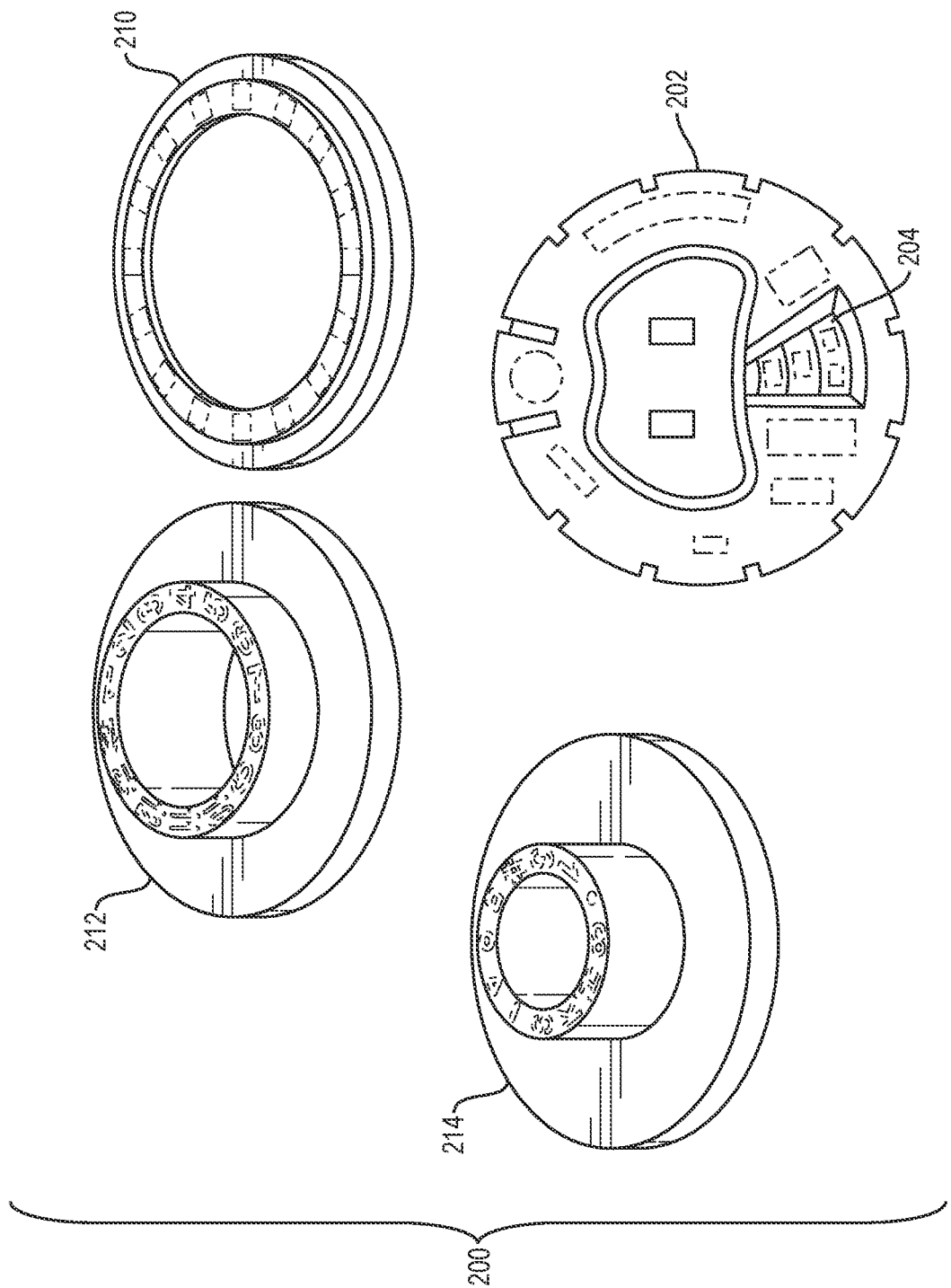

FIGS. 12A and 12B illustrate a variable data set device 200 according to the present disclosure. Specifically FIG. 12A is a side view of the variable data set device 200 and FIG. 12B is a diagram showing components of the variable data set device 200. As shown, the variable data set device 200 includes a circular clutch 202 with a clutch face aperture 204, and a gear system 206 having a plurality of nesting gears, including a top gear 210 with a manipulation tab 232, a middle gear 212 with a manipulation tab 254, and a bottom gear 214 with a manipulation tab 266. Various dashed lines shown in FIG. 12B on the circular clutch 202 can be transparent or open to show different segments of information from the nested gears. According to embodiments of the present disclosure, the device 200 can be a base for a game figure, which can be positioned on a top surface thereof and can be removably attached thereto, e.g., as described in U.S. Patent Application Publication No. 2014/0084542 entitled "Game Piece with Swappable Base".

Figure 13:
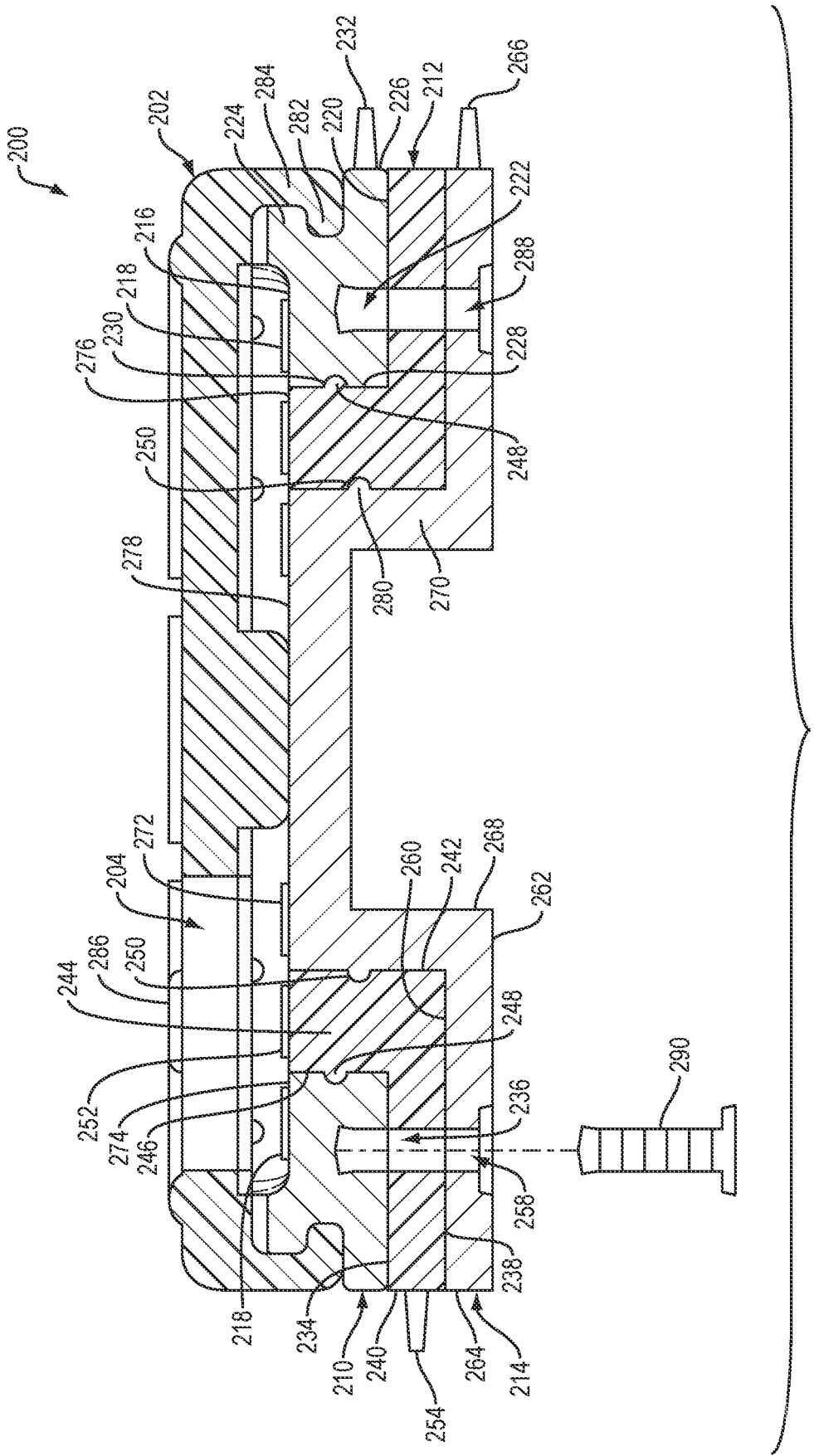
FIG. 13 is a cross-sectional view of the device of FIGS. 12A and 12B.

FIG. 13 is a cross-sectional view of the variable data set device 200, taken parallel to the page, i.e., through a central axis thereof and manipulation tabs 232, 254, and 266 of respective nesting gears 210, 212, and 214. As described above, the nesting gear system 206 includes the top gear 210, the middle gear 212, and the bottom gear 214. The top gear 210 is configured as a ring and includes a top gear face 216 having indicia 218, a bottom gear face 220 with periodic orifices 222, an extending lip 224, a circumferential lateral side 226, an internal lateral side 228 with a receiving groove 230, and the manipulation tab 232. The middle gear 212 is configured also as a ring and includes a top gear face 234 with periodic openings 236 transecting the middle gear 212 from the top face 234 to a bottom face 238, an outer circumferential side 240 having the manipulation tab 254 thereon, an inner lateral side 242, above which is a collar 244 having a height equal to the top gear 210 area on which the indicia 218 reside. An outer lateral side 246 of the collar 244 is provided with a circumferential collar rib 248, while the inner lateral side 242 of the collar 244 is provided with a circumferential receiving groove. Sitting atop the collar 244 are indicia 252.

With continued reference to FIG. 13, the bottom gear 214 is also configured as a ring with a gear face with periodic openings 258 transecting the gear 214 from a top face 260 to a bottom face 262 thereof, an outer circumferential side 264 with the manipulation tab 266 thereon, and an inner lateral side 268, which is concentrically aligned with a bottom gear collar 270, whose height is substantially equals to the height of the middle gear 212 (as measured from the base of the gear to the top of the collar), and upon which resides indicia 272. Accordingly, surfaces 274, 276 and 278, upon which respective indicia 218, 252, and 272 are provided, are substantially coplanar. The bottom gear collar 270 is also provided with a circumferential rib 280.

In the assembled configuration, the collar 270 of the bottom gear 214 is inserted up through the collar 244 of the middle gear 212. It should be noted that the external diameter of the bottom gear collar 270 is approximately equal to the internal diameter of the middle gear collar 244. In this nested position, the outer circumferential rib 280 on the bottom gear collar 270 will insert into the receiving groove 250 of the middle gear collar 244. Furthermore, the middle gear collar 244 is inserted up through the bottom of the top gear 210. Consequently, the outer rib 248 on the middle gear collar 244 will seat into the receiving groove 230 of the top gear 210. With the nesting gear system 200 assembled, the circular clutch 202 is attached to the top gear 210 such that the lip 224 of the top gear 210 engages retaining tabs 282 extending from an outer rim 284 of the clutch 202. Consequently, the retaining tabs 282 and outer ribs trap the gears 210, 212 and 214 within the clutch 202 and nesting gear system 206 structure simultaneously exerting marginal (e.g., frictional) forces, derived from the physical design thereof, that prevent the gears 210, 212 and 214 from rotating freely. Accordingly, the indicia of the collars (e.g., indicia 218, 252 and 272) and indicia provided on a top gear face 286 of the clutch 202 present in a unified manner through the clutch face aperture 204. Lastly, with the top gear 210, middle gear 212, and bottom gear 214 aligned as shown in FIG. 13, the periodic orifices 222 of the top gear 210, and the periodic openings 236 and 258 of the middle and bottom gears 212 and 214 overlap, thereby forming a canal 288. A locking pin 290 is inserted into the canal 288.

Figure 14A:
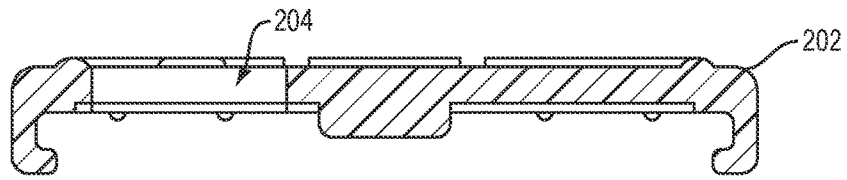
FIGS. 14A, 14B, 14C and 14D are cross-sectional views of the nested gears of the device of FIGS. 12A and 12B, illustrating operation thereof.
Figure 14B:
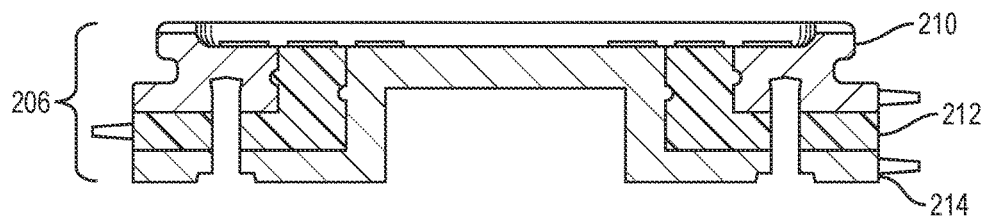
Figure 14C:
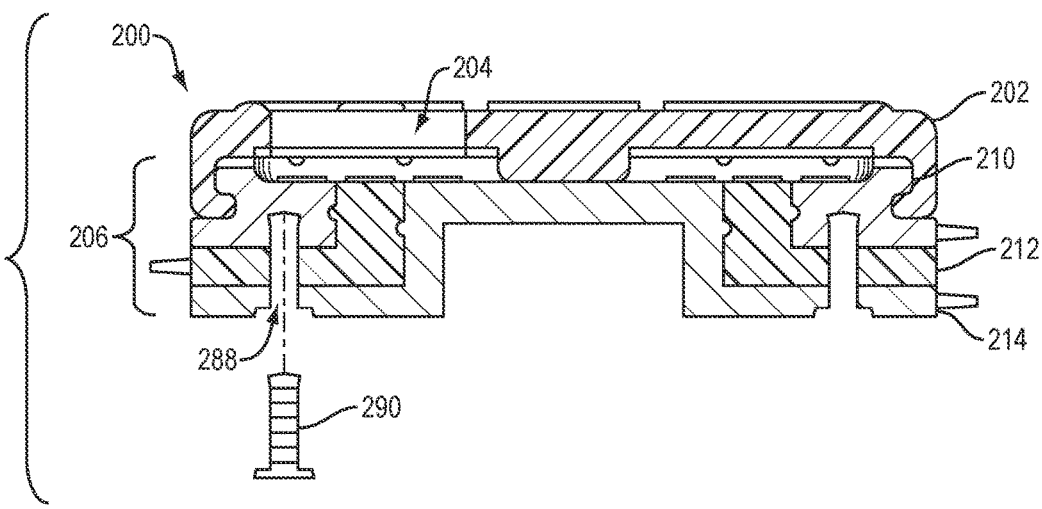
Figure 14D:
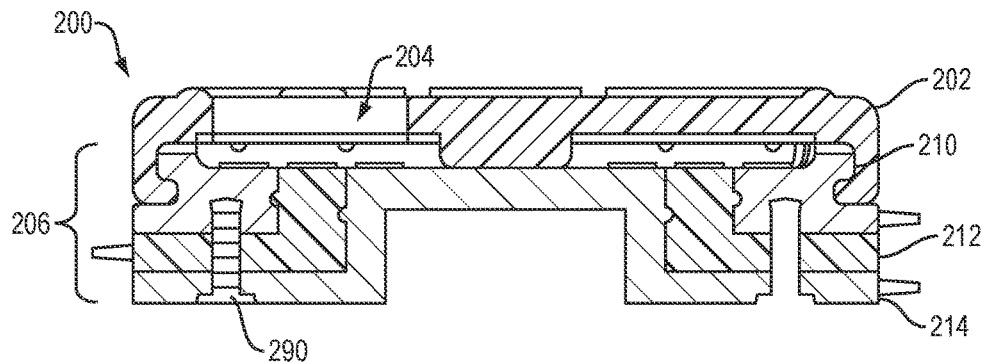

FIGS. 14A-D illustrate operation of the variable data set device 200 of the present disclosure. Specifically, FIG. 14A shows the circular clutch 202, FIG. 14B shows the nesting gear system 206 in an assembled configuration, FIG. 14C shows the circular clutch 202 engaged with the nesting gear system 206, the top gear 210, the middle gear 212, and the bottom gear 214 being rotatable relative to each other, and FIG. 14D shows the circular clutch 202 engaged with the nesting gear system 206 and with the locking pin 290 inserted into the canal 288, thereby preventing rotation of the top gear 210, the middle gear 212, and the bottom gear 214 relative to each other and causing the nesting gear system 206 to rotate as a single unit relative to the circular clutch 202.

Performance of the record-keeping function occurs when: 1) a non-rotational stabilizing force acts on the circular clutch 202, and consequently the nesting gear system 206, via the assembled structure; and 2) as illustrated in FIG. 14D, with the locking pin 290 unifying the nesting gear system 206, rotational movement of top, middle, and bottom gears 210, 212, and 214 occurs synchronously such that any rotational force on any gear or manipulation tab has the effect of rotating all gears in the nesting gear system 206. Consequently, the indicia provided on the gears of the nesting gear set 206 move in unison across the clutch face aperture 204 providing the record-keeping function of a static data set.

Performance of the record-changing function occurs when: 1) the locking pin 290 is removed from the canal 288. In this configuration, a rotational force acts upon each gear in the nested gear system 206 with just enough strength to overcome the marginal (e.g., frictional) forces of the clutch and rib design described herein, which prevents the gears from rotating freely. With the prohibitive force of friction overcome, the gears will rotate and new indicia will be visible through the gear aperture 286. With the independent rotation of each gear of the nested gear system 206, (additional opposing rotational forces may be required on gears which are not the target of intended rotation), any new combination of the three (3) indicia data sets (e.g., indicia 218, 252 and 272) may be presented. With the locking pin 290 re-inserted into the canal 288, the unified data set again rotates synchronously.

The use of two gears with circumferences that are a fixed multiple or fraction of each other can be used to scale input or output up or down or to apply constant multiples of an input to another calculation. For example, by turning a first shaft geared to a second shaft with a 2-to-1 ratio, the shaft receiving the output will rotate half as many times. Differential gears can perform a function in analog computers to provide a mechanical way to perform addition and subtraction. A set of differential gears set between two input shafts with matching gears make a set of rotations that is the mathematical average of the rotations of the two inputs. If one input shaft spins forward three times and the other spins forward once, the differential gears will rotate their attached shaft twice—which is half of four, the total.

Such calculation methods are useful in the hobby gaming world where understanding the ramifications of an event or action are premised on multitudes of granular information and the order in which that information is put in to play.

Game relevant information may be computed/transmitted via a range of gear types including, but not limited to, compound gears, spur gears, rack gears, worm gears, straight bevel gears, internal gears and may be further assisted in operation by cam and clutch systems, and other interfacing gear sub-systems that have the ability to modulate information. Calculated output information positioned on gear side walls, may be viewable through apertures in gear system housings, viewable through apertures in interrelated gears, viewable through associated sub-systems, such as a clutch systems, or viewable via some other mechanical transmitter of data such as a belt, rack gear, bevel gear, etc.

Individual gears may be assembled into gear systems such as, but not limited to, compound gears, rack and pinion gears, bevel gears, planetary gears, worm gears, and internal gears. Gear systems may also include sector gears-a gear that has teeth along a short section of its circumference.

Modularity in the gear systems allows for player modification of gear assemblies to "program" game simulations with varying input data, and hence, provide for different outputs. Such modifications may be in the form of alternate gears with the same ratio but different game data, alternate gears with a different gear ratio, alternate gears with a different gear ratio and game data, alternate gears with different aperture patterns, alternate gear sub-systems, and other configurations that allow for adjustments in the way information is "calculated" and presented in the context of a game. Furthermore, adjustable gears-gears with reconfigurable geometry that may be altered in game, real-time as a function of game tactics and/or strategy, is another expression of the modularity within the gear system. Gear assemblies of the present disclosure can be powered by driving gears, but may also be manually powered in to a rotational state depending on the requirements of the mechanism designed.

The record-keeping and record-changing gear system of the present disclosure may be implemented in various ways conducive to the desired game play experience. The game gear system may be contained within a base supporting a pre-painted miniature game figure, or a game relevant pawn or piece. Alternatively, the game information gear system can be configured as a credit card, mobile phone, or similar size device. Other configurations, such as something as large as a game board, are likewise within the scope of this disclosure.

Having thus described the systems and methods in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A game system comprising:
    a housing;
    a plurality of gears positioned at least partially within the housing;
    one or more apertures in the housing through which portions of indicia on one or more of the plurality of gears can be viewed;
    the plurality of gears including:
        a first gear with indicia thereon;
        a second composite gear having a second top-stacked gear with indicia thereon and one or more apertures, and a second bottom-stacked gear with indicia thereon; and
        a third gear system moveable into and out of engagement with the second composite gear, the third gear system having a fourth gear on one side of the second composite gear and a fifth composite gear on a second side of the second composite gear, the fifth composite gear having a fifth top-stacked gear, a fifth bottom-stacked gear, and a fifth connecting gear meshed with the fifth bottom-stacked gear, the fifth bottom-stacked gear having a smaller diameter than the fifth top-stacked gear;
    wherein, when the fifth composite gear engages the second composite gear, the fifth top-stacked gear meshes with the second top-stacked gear and the fifth connecting gear meshes with the second bottom-stacked gear to move the top and bottom stacked gears of the second composite gear in opposite directions; and
    wherein, when the fourth gear is moved into engagement with the second composite gear, the top and bottom stacked gears of the second composite gear move together.

2. The system of claim 1, wherein the third gear system is moved by a cam structure in the first gear and a cam follower attached to the third gear system.

3. A game gear system comprising:
    a housing containing a plurality of gears with game indicia on one or more of the plurality of gears and one or more apertures in the housing for a player to view the indicia on the one or more of the plurality gears within the housing;
    a first gear set having indicia thereon that are selectively viewable through the one or more apertures in the housing as the first gear set is rotated; and
    a stacked set of gears with information on an upper face of a lower gear and information or indicia on an upper face of the upper gear, and an aperture in the upper gear that permits viewing information on the lower gear,
    wherein the aperture in the housing permits viewing of the information on the upper gear, or on the lower gear through an aperture in the upper gear, or on a combination thereof, and the stacked gears can be moved separately or together.

4. The game gear system of claim 3, wherein more than two gears can be stacked, and each gear that is above another gear has an aperture to allow information on the lower gear to be seen.

5. The game gear system of claim 3, comprising a second gear set selectively engageable with the first gear set to alter rotation of one or more gears of the first gear set.

6. The game gear system of claim 5, wherein the second gear set includes a cam, a switch, a slider, a button, or other means for selectively engaging the first gear set.

7. The game gear system of claim 5, wherein engaging the second gear set causes one or more gears of the first gear set to rotate in an opposite direction.

8. The game gear system of claim 5, wherein engaging the second gear set causes the first gear set to rotate at a different rate.

9. The game gear system of claim 5, wherein the second gear set includes one or more indicia that are viewable through the apertures in the housing.

10. The game gear system of claim 3, comprising first and second drive gears for driving stacked gears, the first drive gear rotating the stacked gears together and the second drive gear rotating the stacked gears with respect to each other.

* * * * *